March 16, 1943.    J. F. DUFFY    2,313,812
SCUFF PLATE
Filed May 8, 1939    2 Sheets-Sheet 1

Inventor
James Francis Duffy
By Liverance and
Van Antwerp
Attorneys

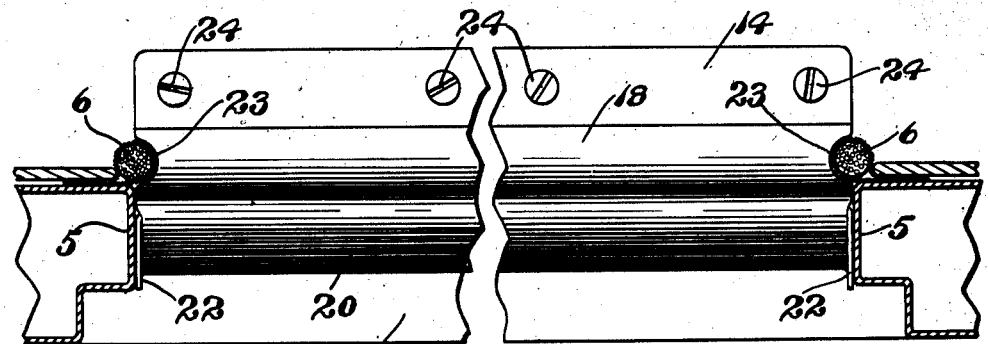
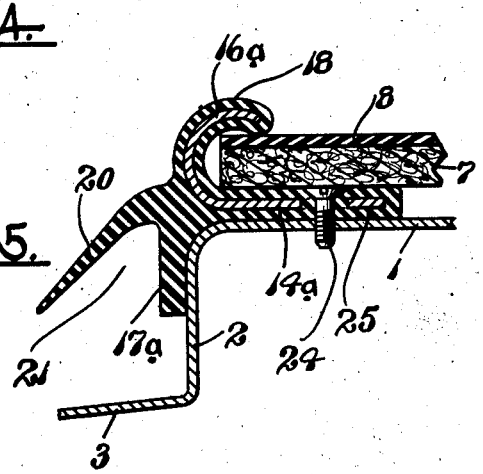
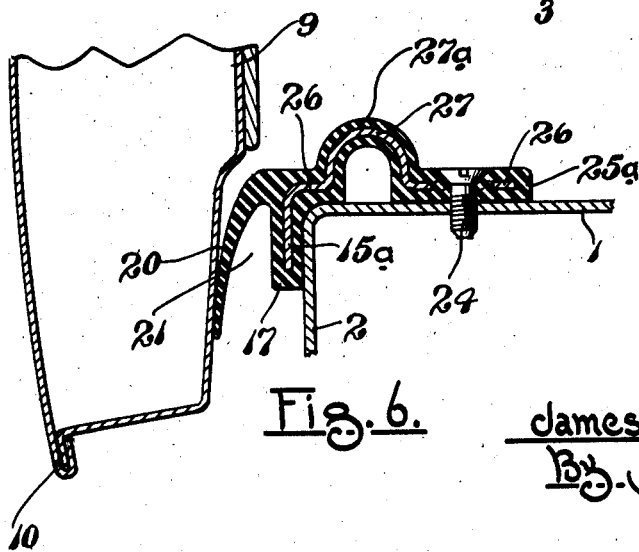

Patented Mar. 16, 1943

2,313,812

UNITED STATES PATENT OFFICE 2,313,812

SCUFF PLATE

James Francis Duffy, Holland, Mich., assignor to Duffy Manufacturing Company, Holland, Mich., a corporation of Michigan Application May 8, 1939, Serial No. 272,311

4 Claims. (Cl. 296—1)

This invention relates to scuff plates which are adapted to be secured at and used along the lower sill of vehicle door openings, particularly the door openings for motor vehicle bodies. This invention is preferably a composite structure of steel and rubber with the steel joined with the rubber and wholly or partially embedded therein to reinforce those parts of the rubber in which embedded. The structure is one which may be economically manufactured and very quickly and readily applied at the place where it is to be used. This construction embodies improvements in connection with the scuff plates disclosed in my application, Serial No. 222,437, filed August 1, 1938, now Patent No. 2,218,814, issued October 22, 1940.

Automobiles are provided with doors which generally have a lower part thereof extending below the floor of either the driving or rear compartments. The floors of the compartments in the automobile are covered with mats, carpets or the like, and it is one object and purpose of the present invention to provide a construction wherein the edges of a mat or carpet at the door opening are embraced by an overhanging portion of the scuff plate which may bear with pressure thereon and thus hold the mat from movement. And as the edges of the mat are covered and concealed, it obviates the necessity of trimming the mat edges, as has heretofore been universal.

A further object of my invention is to provide a scuff plate with an outwardly and downwardly extending flexible apron between which and another part of the scuff plate is a closed pocket which when the door at the door opening is closed and is bearing against the flexible apron, forms the innermost extremity to which air from the outside can go, thus preventing air entrance into the body of the motor vehicle around the lower edges of the door.

The invention may be embodied in numerous forms, some of which are illustrated in the drawings, and it is evident that other modifications in specific detail will occur to others as has already occurred to me, without departing from the invention. The disclosure made therefore is to be considered as showing only what at the present are considered preferred forms of the invention, which because of a specific nature are not to be considered as limiting the invention to the exact and specific forms disclosed. It is further to be understood that while the drawings illustrate the lower end of a door opening in an automobile body as having square corners, the invention is adapted by minor alteration in detail of construction to be applied to the lower end of doors having curved corners at the lower end of the door opening at its vertical sides. It is also to be understood that the overhanging bearing lip underneath which an edge of the mat or carpet is received, may be variously formed and be of any desired shape to meet conditions of manufacture and to adapt the scuff plate to the particular condition which it has to serve.

A further object of the invention is to provide construction, preferably at each end of the outwardly and downwardly extending apron which will bear with a yielding pressure against, and will conform to the contour of the side pillars of the door opening at which it is installed, to thus provide an air seal between the pillars and the scuff plate, whereby the scuff plate which I have invented provides a substantially complete insurance against air entrance into the motor vehicle body at the lower end of the door.

These and many other objects and purposes, and constructions to attain the same, will be apparent as an understanding of the invention is had from the following description, taken in connection with the accompanying drawings, in which:

Fig. 4 is a fragmentary horizontal section and plan, the scuff plate being shown in plan between the spaced apart pillars at each side of the door opening, which pillars and the upholstering at the inner sides thereof are shown in horizontal section.

Fig. 5 is a fragmentary horizontal section similar to Fig. 2, illustrating a modification in construction, and Fig. 6 shows a still further modification or different form of construction of the scuff plate.

Like reference characters refer to like parts in the different figures of the drawings.

Figure 1:
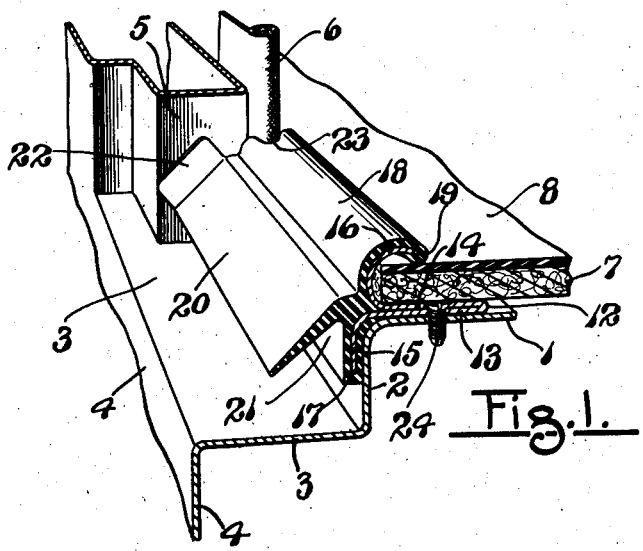
Fig. 1 is a fragmentary perspective view and cross section of one form of my invention, showing the same attached at the lower end of a motor vehicle body door opening.

At a door opening in a motor vehicle body, the horizontal floor 1 is turned downwardly at right angles, as indicated at 2, and thence outwardly in a horizontal section 3. Beyond the section 3 it may be continued in a downwardly turned section 4, on which a running board at the side of the automobile body may be secured; or in other cases where there is no running board, the sction 3 may not be further continued. But in any event, at the lower sill of the door opening there are present supporting members which include the horizontal floor 1 and the sill portions 2 and 3. The pillars 5, located vertically, one at each side of the door opening, are of any preferred construction. Automobile bodies are almost universally of a steel construction, the parts being very securely welded together. At the inner sides of the pillars are vertical welts or cord trimmings 6 which provide the edge finish at the vertical sides of the door opening of the interior upholstering of the body. The floor in the compartments of the motor vehicle body is usually equipped with a covering mat which may consist of a felt or other body 7 with a rubber upper surfacing 8. It is of course to be understood that this mat may be made of other materials and that the particular materials described in the construction shown are in no way essential for the operation or utility of the present invention.

The door 9 which is hingedly connected at one of its vertical edge portions at a vertical pillar of the door opening, is ordinarily provided at its free edges with a projecting bead as 10, which in practice, when the door is closed, should not come against any metal part of the body. Therefore, as shown in Fig. 2, when the door is in closed position, there is a space indicated at 11 below the door which, if unobstructed, might permit the entrance of a considerable air underneath the lower edge of the door into the body of the motor vehicle.

It is in this environment which has been described that my invention is to be used. In Figs. 1 to 4, inclusive, a construction of scuff plate is shown of composite steel and rubber. A steel plate of the proper length to extend substantially between the side pillars of a door opening is bent longitudinally upon itself as at 12, thereby providing lower and upper horizontal flat sections 13 and 14 of steel, lying one against the other, the former of which is curved downwardly and terminates in a downwardly extending vertical flange 15, while the later is curved upwardly, preferably substantially in the arc of a circle as at 16, back over the upper section 14, as shown. The diverging end portions 15 and 16 have a rubber body applied thereto, the flange 15 being wholly covered by the rubber so that it is embedded in the rubber, thereby making a downwardly extending vertical member 17. Rubber is also applied to the outer surface of the curved overhanging portions 16, as indicated at 18, and in practice the free edge portion of the overhanging section 16 is embedded in rubber, as at 19. An apron 20 preferably integrally molded with the rubber body, is connected at its upper portion with the rubber body which joins the parts 17 and 18, and extends downwardly and outwardly with a substantially triangular shaped pocket 21 between the apron and the parts 17. The pocket is fully open at its lower side and extends the length of the scuff plate. At each end the apron 20 has a flexible integral projecting portion 22, which extends a short distance beyond the adjacent ends of the overhanging rubber covered lip portion 16, 18. Such overhanging rubber covered lip portion is recessed at 23 at each end to conform to the shape of the bead or welt 6, one of which is positioned vertically at the inner side of each pillar 5 of the door frame.

The scuff plate thus constructed is applied at the lower side of the door opening by locating the lower horizontal section 13 of the metal plate upon the outer portions of the floor 1, and bringing the inner side of the rubber member 17 snugly against the outer side of the vertical section 2 of the sill. In such position, by using a number of screws 24, which pass downwardly through openings 24a in the metal sections 13 and 14 and through threaded openings in the floor 1, the scuff plate is permanently secured in place. When it is thus secured, the recesses at 23 conform to and receive the beads or welts 6, while the projecting flexible end portions 22 of the apron 20 are brought against the vertical faces of the pillars 5 and are bent substantially at right angles to the apron 20, thus being under an inherent tension which causes such end portions 22 to press snugly against the adjacent faces of the pillars. The edge portions of the mat or floor covering extend over the upper side of the upper metal section 14 and underneath the overhanging lip, the rubber covered end 19 of which comes against the upper side of the mat a short distance within its adjacent edge. The curved portion 16 of the metal part of the overhanging lip may be sprung upwardly sufficiently to insert the mat in place, and when released will cause the rubber covering end 19 to bear snugly and with pressure against the upper side of the mat.

Figure 2:
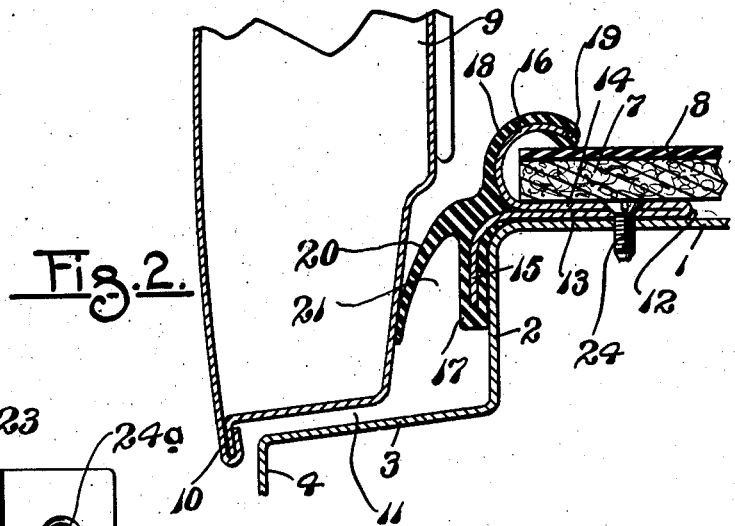
Fig. 2 is a somewhat enlarged fragmentary transverse section similar to the section shown in Fig. 1, showing the cooperation of the scuff plate with the door when such door is in closed position.
Figure 3:
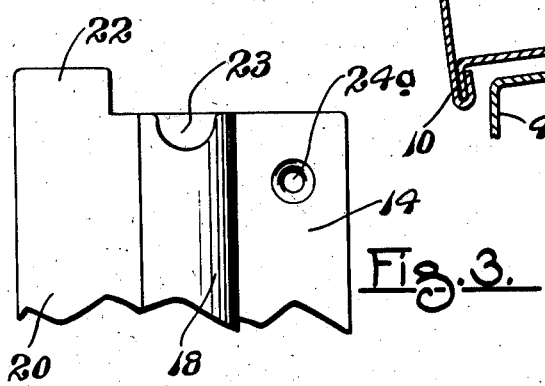
Fig. 3 is a fragmentary plan view of one end of the scuff plate of my invention.

It is evident that when the door is closed as in Fig. 2, such door at its inner side and near its lower end comes against the apron 20 and moves or flexes it inwardly. There is thus provided a complete seal against air passing through the space at 11 into the body of the motor vehicle.

In Fig. 5 a modification in structure is shown. The steel plate in such case is completely embedded within the rubber covering of the scuff plate. The plate consists of a horizontal section 14a with an upwardly curved overhanging lip section 16a, both of which are completely embedded in rubber, the horizontal section 14a of the steel being rubber covered at both its upper and lower sides and around its free edge, as indicated at 25. The member 17a extends downwardly like the member 17 before, but it is not reinforced with steel reinforcement. The apron 20 with the end extensions 22 thereon is the same as before and is integrally connected with the rubber covering of the steel in the same manner. Such structure serves the same purpose and is used and applied in the same way as previously described.

In Fig. 6 a plate of sheet metal has a horizontal section 26 which, longitudinally between its sides, is formed into an inverted U-shaped bead 27. The plate 26 at its outer portion is bent downwardly into a vertical flange 15a. Such vertical flange has the rubber covering member 17 exactly as the rubber member 17 covers the flange 15 in the structure shown in Figs. 1 and 2. The plate 26 is also rubber covered, as at 25a, and likewise the steel bead 27 is covered with rubber as indicated at 27a. The apron 20 extends outwardly and downwardly therefrom. The pocket at 21 is present in all structures. The door when closed comes against the apron and flexes it inwardly. Because of the tendency of the apron to spring outwardly, it bears with a yielding pressure against the door and makes a tight seal against the passage of air. The member 17 or 17a with or without the steel reinforcement, is brought snugly against the outer side of the vertical part 2 of the door sill and seals against air entrance.

It will be evident from the description and disclosure that there has been provided a scuff plate which may be readily manufactured by molding a rubber composition in the desired forms of molds, and with metallic reinforcing in various forms, which is placed in the mold so that the rubber is vulcanized inseparably to the metal. The construction is capable of wide variations in detail, and for conformity to the particular specifications of the lower ends of door openings to which it is to be applied.

The invention therefore is to be considered comprehensive of all forms of structure coming within the scope of claims appended hereto and not to be limited to any specific details of the disclosure made, except as may be required by said claims.

I claim:

1. A scuff plate for a vehicle body comprising, an elongated plate of sheet metal having a flat substantially horizontal section curved upwardly and partially over itself at its outer portion, a rubber covering at the outer side of said curved portion of the sheet metal member and extending around and at the inner side of the curved section, said rubber member having a depending vertical portion extending below the plane of said flat horizontal section, and having a downwardly and outwardly inclined apron extending the full length of the sheet metal member integrally joined with said rubber covering substantially in the plane of said flat section of the sheet metal member.

2. A construction containing the elements in combination defined in claim 1, said apron at each end having a flexible integral rubber projecting portion adapted to be turned outwardly at right angles thereto, as specified.

3. A scuff plate for a vehicle body comprising, a sheet metal elongated member having a flat section adapted to lie in a substantially horizontal plane and having a curved portion bent upwardly and over the flat section and lying lengthwise thereof, a second sheet metal member curved in a downward direction and terminating in a vertical portion, said second sheet metal member lying immediately below the first sheet metal member and having equal length therewith, and a rubber covering over the outer side of said curved portion and extending around and at the inner side of the edge of said curved portion of the first metal section, said rubber covering also covering the vertical portion of said second metal section, and said rubber covering having an outwardly and downwardly extending apron integrally joining therewith substantially in the same horizontal plane as the flat section of the first sheet metal member, said apron when free to do so being located substantially at an angle of 45° to the horizontal and vertical, and said apron extending the full length of said sheet metal member.

4. A construction containing the elements in combination defined in claim 3, and a flexible integral projecting portion at each end of the apron extending beyond said sheet metal members and the covering therefor and adapted to be turned outwardly at right angles to said apron, as specified.

JAMES FRANCIS DUFFY.